United States Patent

Fukaya

[11] Patent Number: 5,423,405
[45] Date of Patent: Jun. 13, 1995

[54] CLUTCH RELEASE BEARING DEVICE

[75] Inventor: Nobuki Fukaya, Takahama, Japan

[73] Assignee: Aisin Seiki Kabushiki Kaisha, Kariya, Japan

[21] Appl. No.: 157,293

[22] Filed: Nov. 26, 1993

[30] Foreign Application Priority Data

Nov. 27, 1992 [JP] Japan .................. 4-318107

[51] Int. Cl.⁶ .............................................. F16D 23/14
[52] U.S. Cl. ..................... 192/98; 192/70.13; 192/110 B; 192/DIG. 1
[58] Field of Search ............... 192/98, 89.24, DIG. 1, 192/70.13, 110 B

[56] References Cited

U.S. PATENT DOCUMENTS

| 4,399,898 | 8/1983 | Olschewski et al. | 192/110 B X |
|---|---|---|---|
| 4,502,583 | 3/1985 | Limbacher | 192/98 |
| 4,648,499 | 3/1987 | Despres | 192/98 |
| 4,658,945 | 4/1987 | Muller . | |
| 4,691,815 | 9/1987 | Maycock et al. | 192/98 |
| 4,733,764 | 3/1988 | Corral et al. | 192/98 |
| 4,809,835 | 3/1989 | Ziegler et al. . | |
| 5,014,840 | 5/1991 | Tojima | 192/98 |
| 5,183,141 | 2/1993 | Abe et al. | 192/98 X |
| 5,201,393 | 4/1993 | Takeuchi et al. | 192/98 X |
| 5,318,162 | 6/1994 | Maucher et al. | 192/98 X |

FOREIGN PATENT DOCUMENTS

| 0192081 | 8/1986 | European Pat. Off. . | |
|---|---|---|---|
| 2518678 | 6/1983 | France . | |
| 2588051 | 4/1987 | France | 192/110 B |
| 3910671 | 10/1989 | Germany | 192/98 |
| 62-37522 | 2/1987 | Japan . | |
| 2195413 | 4/1988 | United Kingdom | 192/98 |

Primary Examiner—Rodney H. Bonck
Attorney, Agent, or Firm—Burns, Doane, Swecker & Mathis

[57] ABSTRACT

A clutch release bearing device includes a first member for being connected to a clutch release fork, a second member slidably disposed on the first member for retaining a clutch spring, a sleeve member which is mounted on the first member, and a detent member which engages the first member and the second member. The first member includes a bearing mechanism and a groove portion while the sleeve member includes a restrict portion. The detent member engages the groove portion and contacts the restrict portion to maintain the first and second members in engagement with one another.

10 Claims, 3 Drawing Sheets

CLUTCH RELEASE BEARING DEVICE

BACKGROUND OF THE INVENTION

1. Field of the Invention

This invention relates to a clutch release bearing device and more particularly to a clutch release bearing device for use in connection with a power train of a vehicle.

2. Description of the Related Art

A conventional clutch release bearing device is disclosed in Japanese Patent Laid Open No. 62(1987)-37522. The clutch release bearing device disclosed in that document comprises a first member connected to a clutch release fork through a bearing mechanism and a second member which retains a clutch spring. The first member and the second member are adapted to engage and disengage each other. A wall portion of the first member engages a shoulder portion of the second member through a detent member. When the detent member is expanded in a groove of the second member as a result of the stroke of a sleeve member, the first member is disengaged from the second member.

However, during operation of this device, the first member must be moved in the left direction (as seen in the drawing figures of the aforementioned Japanese document) in order to expand the detent member. Therefore, when the first member and the second member are disengaged from one another, the first member must be moved in the reciprocally horizontal direction. Consequently, the clutch release bearing device cannot be conveniently assembled.

Further, the clutch release bearing device comprises a clearance in the axial direction between the first member and the second member. Therefore, the first member must always be pulled toward the fight direction (as seen in the drawing figures of the aforementioned Japanese document) by the clutch release fork. In addition, the first member and the second member engage one another by two points through the detent member. Therefore, the first member and the second member must possess sufficient durability.

Furthermore, the clutch release bearing device requires that the outside diameter of the sleeve member be precisely sized in order to reliably disengage the first member from the second member.

SUMMARY OF THE PRESENT INVENTION

It is an object of the present invention to provide an improved clutch release bearing device that can be conveniently assembled.

It is another object of the present invention to provide an improved clutch release bearing device which is durable.

It is a further object of the present invention to provide an improved clutch release bearing device which does not include a clearance between the first member and the second member.

It is a further object of the present invention to provide an improved clutch release bearing device which can reliably engage the first member with the second member.

It is a further object of the present invention to provide an improved clutch release bearing device which can reliably detach the first member from the second member.

It is a further object of the present invention to provide an improved clutch release bearing device which can be used in conjunction with any kind of power train.

It is a further object of the present invention to provide an improved clutch release bearing device which can be easily manufactured.

It is a further object of the present invention to provide an improved clutch release bearing device which is simple in structure and small in size.

It is a further object of the present invention to provide an improved clutch release bearing device which can be manufactured at a relatively low cost.

To achieve the above mentioned objects, a clutch release bearing device in accordance with the present invention comprises a first member for being connected with a clutch release fork, a second member slidably disposed on the first member for retaining a clutch spring, a sleeve member which is mounted on the first member, and a detent member which engages the first member and the second member. The first member includes a groove portion and a bearing mechanism, the sleeve member includes a restrict portion, and the detent member engages the groove portion and contacts the restrict portion.

BRIEF DESCRIPTION OF THE DRAWINGS

Additional features and advantages of the clutch release bearing device according to the present invention will become more apparent from the following description considered in conjunction with the accompanying drawing figures wherein.

DETAILED DESCRIPTION OF PREFERRED EMBODIMENT OF THE INVENTION

Figure 1:
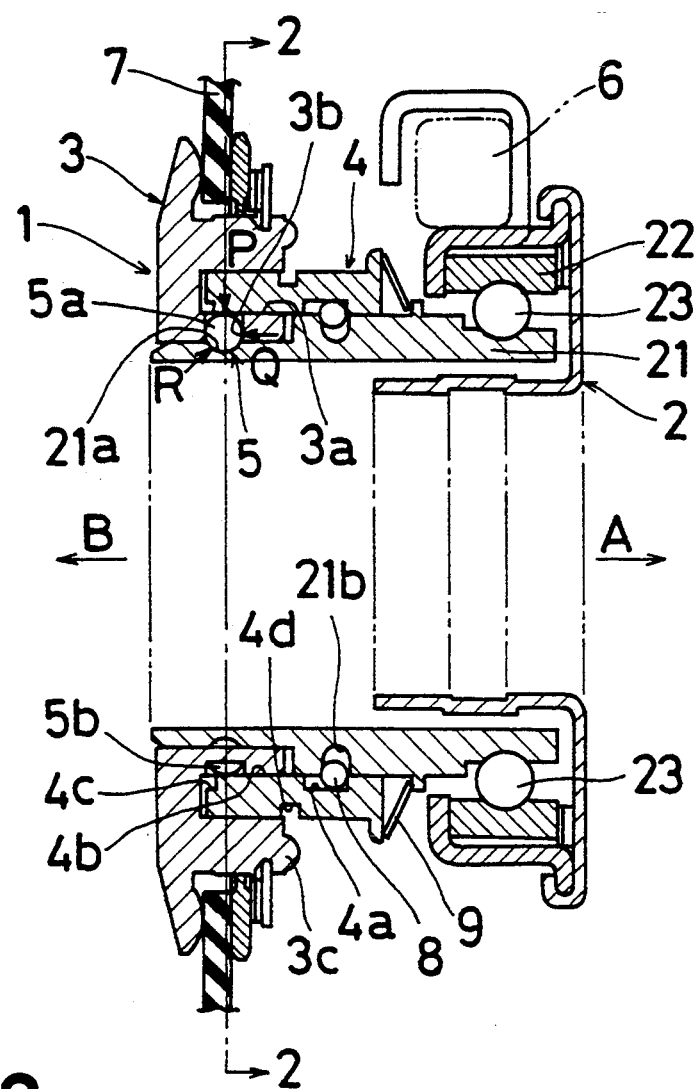
FIG. 1 is a cross-sectional view of a clutch release bearing device of the present invention.
Figure 2:
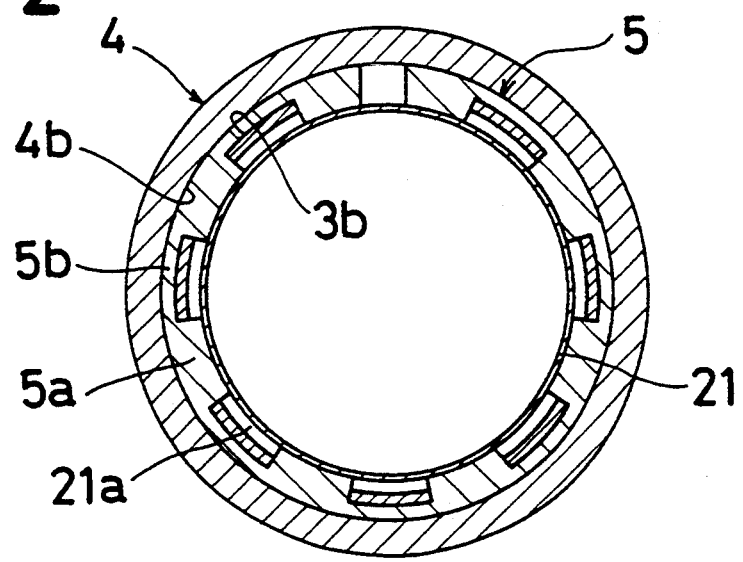
FIG. 2 is a cross-sectional view of a clutch release bearing device of the present invention taken along the section line 2—2 of FIG. 1.

Referring to FIG. 1, the clutch release bearing device 1 of the present invention comprises a first member 2, a second member 3, a sleeve member 4 and a detent member 5. The first member 2 includes an inner race 21 which is axially slidably mounted on an input shaft of a transmission (not shown). The first member 2 further includes an outer race 22 which is formed in a cylindrically shaped configuration. The outer race 22 is connected to a clutch release fork 6 which is connected to a clutch release cylinder (not shown). The outer race 22 can be rotatably disposed relative to the inner race 21 through a plurality of balls 23 which constitute rolling elements of the bearing mechanism. The rolling balls 23 are disposed between the inner race 21 and the outer race 22. A groove portion 21a for being engaged with the detent member 5 is disposed on an outer circumference of the inner race 21.

The second member 3 is formed in a cylindrically shaped configuration and is mounted on the outer circumference of the inner race 21. A diaphragm spring 7 which constitutes a clutch spring of a clutch mechanism (not shown) is supported on the outer circumference of the second member 3. The second member 3 has a first slot 3a for being engaged with the sleeve member 4, and a second slot 3b for being engaged with the detent member 5. A projecting portion 3c is formed on a side portion of the second member 3 for functioning as a fulcrum portion during use and operation of a tool 10 (see FIG. 3).

The sleeve member 4 is formed in a cylindrically shaped configuration and is axially slidably disposed on the outer circumference of the inner race 21. The sleeve member 4 is adapted to be inserted into the first slot 3a of the second member 3.

The sleeve member 4 includes a first groove 4a which faces a groove 21b formed in the inner race 21. The sleeve member 4 is slidably supported on the outer circumference of the inner race 21 through a ring 8. The ring 8 is disposed in the first groove 4a of the sleeve member 4 and the groove 21b of the inner race 21. In that way, the sleeve member 4 is inhibited or prevented from being detached from the inner race 21. The sleeve member 4 is provided with a restrict portion 4b for contacting the detent member 5, and a step-shaped cut portion 4c into which the detent member 5 can expand. Furthermore, a second groove 4d for engaging the tool 10 (see FIG. 3) is disposed on the outer circumference of the sleeve member 4.

The detent member 5 has a mainly circular cross-sectional shape 5a and is configured in the form of an incomplete ring with a cut portion on the circumference. The detent member 5 includes a plurality of sectional semicircular portions 5b each of which is formed by cutting out a semicircular portion of the detent member 5. The detent member 5 is supported in the second slot 3b of the second member 3 so as to be expanded and is further engaged with the groove portion 21a of the inner race 21. Furthermore, the detent member 5 contacts the restrict portion 4b of the sleeve member 4.

The second slot 3b in the second member 3 comprises a plurality of through portions in the radial direction of the second member 3 so as to engage the circular portions 5a of the detent member 5. The second slot 3b further includes a plurality of unthrough portions for engaging the semicircular portions 5b.

A dish spring 9 is disposed between the inner race 21 and the sleeve member 4. The sleeve member 4 is always biased by the dish spring 9 in the direction represented by the arrow B in FIG. 1 so that the restrict portion 4b contacts the detent member 5. The arrow B also indicates the direction in which the first member 2 is engaged with the second member 3.

The mounting operation of the clutch bearing device 1 will now be described. In FIG. 1, the clutch release bearing device 1 is illustrated in its assembled condition. In order to disengage the first member 2 from the second member 3, a tool 10 is fit into the second groove 4d of the sleeve member 4. The sleeve member 4 is then slid in the direction depicted by the arrow A against the elastic force of the dish spring 9 by rotating the tool 10 in the clockwise direction in FIG. 3. The arrow A also indicates the direction in which the first member 2 is disengaged from the second member 3. During the rotation of the tool 10, the projecting portion 3c acts as a fulcrum point. Therefore, the restrict portion 4b of the sleeve member 4 is disengaged from the detent member 5 so that the detent member 5 is positioned opposite the cut portion 4c of the sleeve member 4.

Figure 3:
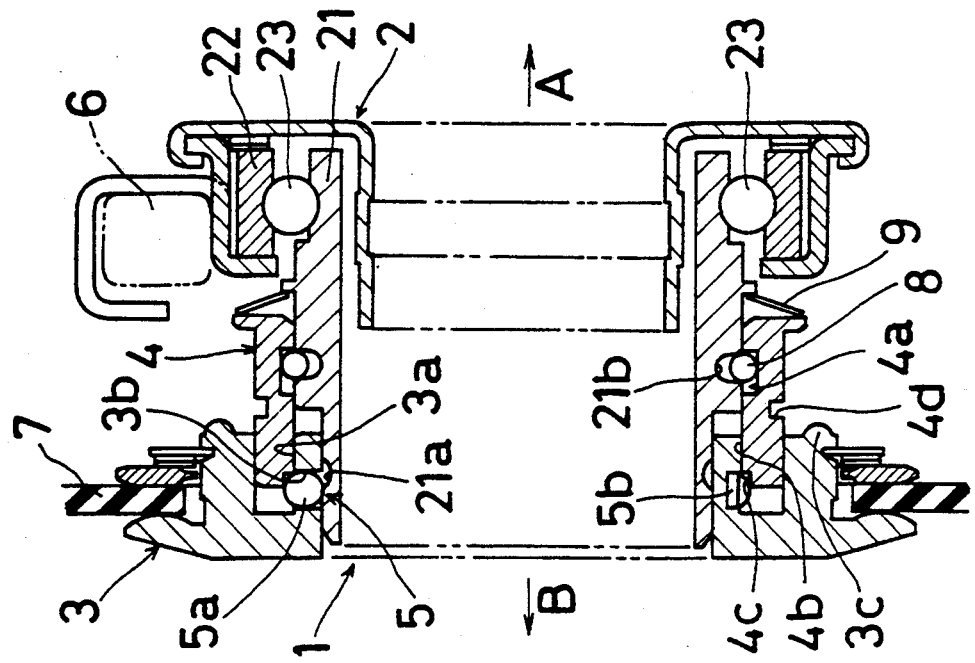
FIG. 3 is a cross-sectional view of a clutch release bearing device illustrating the mounting operation of the invention.
Figure 4:
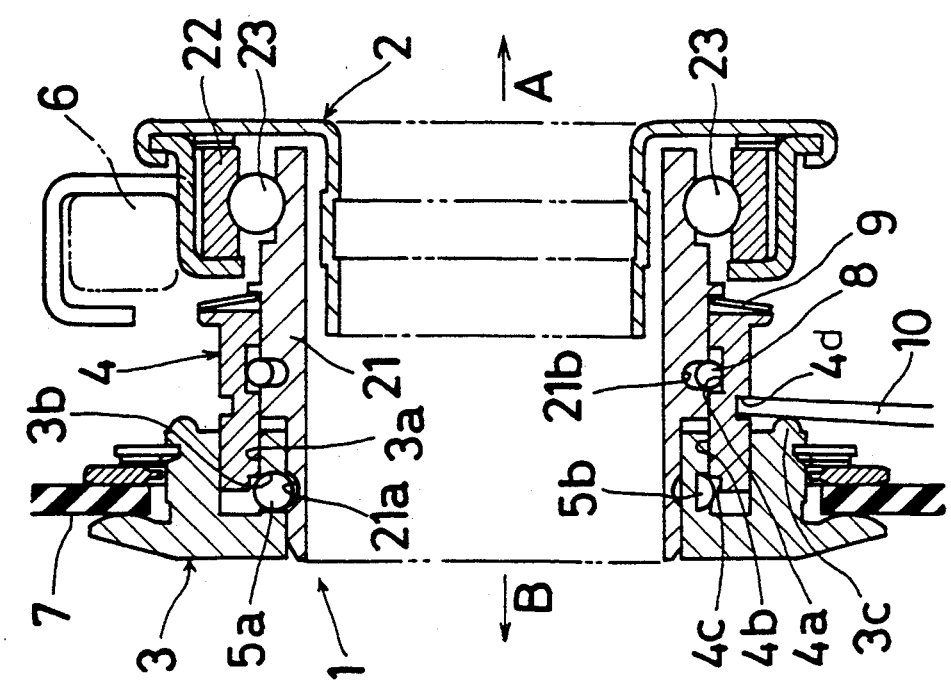
FIG. 4 is a cross-sectional view of a clutch release bearing device illustrating the mounting operation of the invention.
Figure 5:
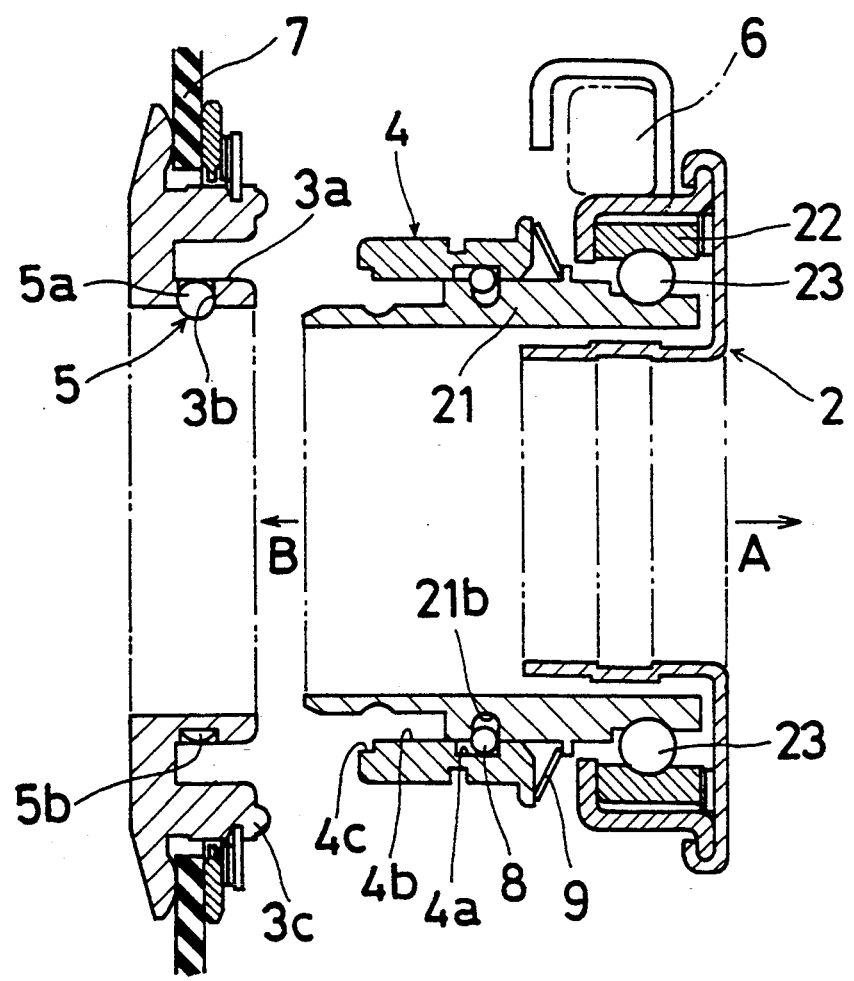
FIG. 5 is a cross-sectional view of a clutch release bearing device illustrating the mounting operation of the invention.

At this time, because the first member 2 is also slid in the direction of the arrow A in FIG. 3 through the dish spring 9, the circular portions 5a of the detent member 5 are disengaged from the groove portion 21a, and the detent member 5 is expanded into the cut portion 4c by the outer circumference of the inner race 21. Thus, the first member 2 is completely disengaged from the second member 3 as shown in FIG. 5 by further sliding movement of the first member 2. As shown in FIG. 5, when the first member 2 and the second member 3 are completely disengaged, the sleeve member 4 and the dish spring 9 continue to be mounted on the first member 2 while the detent member 5 is supported on the second member 3.

When the first member 2 and the second member 3 shown in FIG. 5 are assembled, the first member 2 is slid in the direction of the arrow B to insert the inner race 21 into the inner circumference while also fitting the sleeve member 4 into the first slot 3a of the second member 3. Thus, the detent member 5 is expanded by the outer circumference of the inner race 21 and the circular portions 5a of the detent member 5 engage the groove portion 21a of the first member 21. Consequently, the detent member 5 is positioned opposite the restrict portion 4b. The inner race 21 is inclined at the left free end (as seen in FIGS. 1, 3, 4 and 5) so that the detent member 5 can easily move up the outer circumference of the inner race 21. As a result, the inner race 21 of the first member 2 engages the second member 3 through the detent member 5 as shown in FIG. 1.

When the clutch release fork 6 is moved in the direction of the arrow A by the clutch operation in the FIG. 1, the inner race 21 is also slid in the direction of the arrow A. At this time, the sleeve member 4 does not move relative to the inner race 21 because of the elastic force of the dish spring 9. Therefore, the detent member 5 is positioned opposite the restrict portion 4b, and the restrict portion 4b prevents the detent member 5 from expanding. As a result, the detent member 5 does not disengage from the groove portion 21a. Consequently, the second member 3 slides in the direction of the arrow A through the inner race 21, the sleeve member 4 and the detent member 5. Therefore, an inner circumferential portion of the diaphragm spring 7 is also biased in the direction of the arrow A and the clutch mechanism is under the release condition. As a result, the first member 2 and the second member 3 are not disengaged from one another when the clutch release fork 6 is moved by clutch operation.

In accordance with the above mentioned structure, because the clutch release bearing device 1 of the invention can be disassembled into the first member 2 and the second member 3, the clutch release bearing device 1 is convenient when the mounting operation of the transmission and the clutch mechanism is performed.

Further, when the first member 2 and the second member 3 are disengaged, the sleeve member 4 can be slid only in the direction of the arrow A without also being slid in the direction of the arrow B. Moreover, since the sleeve member 4 is moved by the tool 10, the first member 2 and the second member 3 are completely disengaged. Furthermore, the sleeve member 4 does not have to be precisely sized in relation to the detent member 5, whereby the sleeve member 4 and the detent member 5 can be more easily manufactured.

Moreover, when the clutch release bearing device 1 is assembled, the detent member 5 is retained at three points indicated by the arrows P, Q and R in FIG. 1. The arrows P, Q and R indicate respectively the radial force resulting from the sleeve member 4, the axial force resulting from the second member 3, and the force oblique to the axial direction resulting from the first member 2. Therefore, the clutch release bearing device 1 of the invention can decrease the stress which is generated between the detent member 5 and each of the sleeve member 4, the second member 3 and the first member 2. Consequently, these elements do not have to possess great strength.

Furthermore, in accordance with the structure of the invention, when the clutch release bearing device 1 is assembled, the clutch release bearing device 1 does not comprise a clearance between the first member 2 and the second member 3 in the axial direction (i.e., the direction represented by the arrow A and the arrow B in FIG. 1). Therefore, the first member 2 does not have to be pulled in the direction of the arrow A in FIG. 1 by the clutch release fork 6.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A clutch release bearing device comprising;
    a first member for being connected to a clutch release fork, said first member including a bearing mechanism and a groove portion;
    a second member slidably disposed on the first member for retaining a clutch spring;
    a sleeve member mounted on the first member, said sleeve member including a restrict portion; and
    a detent member which engages the first member and the second member, said detent member engaging the groove portion of the first member and contacting the restrict portion of the sleeve member, an end of said sleeve member having a step-shaped cut portion for receiving the detent member when the sleeve member is moved in a direction away from the second member.

2. A clutch release bearing device as recited in claim 1, including a spring member disposed between the sleeve member and the first member for biasing the sleeve member toward the second member.

3. A clutch release bearing device as recited in claim 1, wherein the detent member includes a portion that is semicircular in cross-section, the second member engaging the semicircular cross-sectional portion to locate the detent member circumferentially.

4. A clutch release bearing device as recited in claim 3, wherein said second member includes a slot that receives the detent member.

5. A clutch release bearing device as recited in claim 4, wherein the second member is provided with a projecting portion that projects from one side of the second member to serve as a fulcrum for moving the sleeve in a direction away from the second member.

6. A clutch release bearing device comprising:
    a first member for being connected to a clutch release fork, said first member including a bearing mechanism and a groove portion;
    a second member slidably disposed on the first member for retaining a clutch spring, said second member including a first slot and a second slot;
    a sleeve member mounted on the first member, the sleeve member engaging the first member through a ring, said sleeve member engaging the first slot in the second member, the sleeve member including a restrict portion located at an inner circumferential surface thereof; and
    a detent member disposed in the second slot of the second member and engaging the groove portion in the first member, the detent member contacting the restrict portion of the sleeve member at an outer circumferential surface thereof.

7. A clutch release bearing device as recited in claim 6, wherein said first member includes an inner race and an outer race, an outer circumferential surface of the inner race being provided with a recessed portion that receives the detent.

8. A clutch release bearing device as recited in claim 6, wherein said detent includes portions which are semicircular in cross-sectional shape and portions which are circular in cross-sectional shape.

9. A clutch release bearing device as recited in claim 6, wherein the second member is provided with a projecting portion that projects from a side of the second member to serve as a fulcrum for moving the sleeve in a direction away from the second member.

10. A clutch release bearing device comprising;
    a first member for being connected to a clutch release fork, said first member including a bearing mechanism and a groove portion;
    a second member slidably disposed on the first member for retaining a clutch spring;
    a sleeve member mounted on the first member, said sleeve member including a restrict portion; and
    a detent member which engages the first member and the second member, said detent member engaging the groove portion of the first member and contacting the restrict portion of the sleeve member, the detent member having a portion that is semicircular in cross-section, the second member engaging the semicircular cross-sectional portion to locate the detent member circumferentially, said second member having a slot that receives the detent member, and said second member being provided with a projecting portion that projects from one side of the second member to serve as a fulcrum for moving the sleeve in a direction away from the second member.

* * * * *